(12) United States Patent
Gilboa et al.

(10) Patent No.: US 9,137,463 B2
(45) Date of Patent: Sep. 15, 2015

(54) ADAPTIVE HIGH DYNAMIC RANGE CAMERA

(75) Inventors: Guy Gilboa, Kiryat Tivon (IL); David Cohen, Nesher (IL); Giora Yahav, Haifa (IL); Eli Larry, Beit She'an (IL); Shlomo Felzenshtein, Nesher (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 13/106,844

(22) Filed: May 12, 2011

(65) Prior Publication Data

US 2012/0287242 A1 Nov. 15, 2012

(51) Int. Cl.
| | |
|---|---|
| *H04N 5/00* | (2011.01) |
| *H04N 5/347* | (2011.01) |
| *G01S 17/89* | (2006.01) |
| *G01S 7/481* | (2006.01) |
| *H04N 5/235* | (2006.01) |
| *H04N 13/02* | (2006.01) |

(52) U.S. Cl.
CPC .............. *H04N 5/347* (2013.01); *G01S 7/4816* (2013.01); *G01S 17/89* (2013.01); *H04N 5/235* (2013.01); *H04N 13/0271* (2013.01)

(58) Field of Classification Search
CPC ....................................... H04N 13/02
USPC ............................. 348/46, E13.074
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Jay Patel
*Assistant Examiner* — Frank Huang
(74) *Attorney, Agent, or Firm* — Gregg Wisdom; Judy Yee; Micky Minhas (57) ABSTRACT

An embodiment of the invention provides a time of flight 3D camera comprising a photosensor having a plurality of pixels that generate and accumulate photoelectrons responsive to incident light, which photosensor is tiled into a plurality of super pixels, each partitioned into a plurality of pixel groups and a controller that provides a measure of an amount of light incident on a super pixel responsive to quantities of photoelectrons from pixel groups in the super pixel that do not saturate a readout pixel comprised in the photosensor.

15 Claims, 4 Drawing Sheets

(56) References Cited

U.S. PATENT DOCUMENTS

| | | |
|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,900,834 B2 | 5/2005 | Henderson et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,084,973 B1 | 8/2006 | Ingram |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |

(56) References Cited

U.S. PATENT DOCUMENTS

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0008267 | A1 | 1/2004 | Chen et al. |
| 2004/0079893 | A1* | 4/2004 | Dietz et al. ............... 250/458.1 |
| 2005/0133687 | A1* | 6/2005 | Bock ........................ 250/208.1 |
| 2008/0024614 | A1 | 1/2008 | Li et al. |
| 2008/0026838 | A1 | 1/2008 | Dunstan et al. |
| 2008/0036893 | A1 | 2/2008 | De Godzinsky |
| 2009/0030630 | A1* | 1/2009 | Eitan et al. ..................... 702/81 |
| 2010/0066849 | A1 | 3/2010 | Lim et al. |
| 2010/0128109 | A1* | 5/2010 | Banks ........................... 348/46 |
| 2011/0052095 | A1* | 3/2011 | Deever ......................... 382/300 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real-World Disorders", The Washington Post, Mar. 27, 1995, Science Psychology, 2 pages.

"Simulation and Training", 1994, Division Incorporated.

High Dynamic Range Imaging: Spatially Varying Pixel Exposures; Nayar et al.; Published Date: 2000 http://ieeexplore.ieee.org/stamp/stamp.jsp?tp=&arnumber=855857.

Adaptive Dynamic Range Imaging: Optical Control of Pixel Exposures Over Space and Time; Nayar et al.; Published Date: 2003; Proceedings of the Ninth IEEE International Conference on Computer Vision (ICCV 2003).

* cited by examiner

ADAPTIVE HIGH DYNAMIC RANGE CAMERA

TECHNICAL FIELD

Embodiments of the invention relate to adjusting sensitivity of a camera to light that it receives from a scene that the camera images.

BACKGROUND

Time of flight (TOF) three-dimensional (3D) cameras determine distances to features in a scene by acquiring an image, conventionally referred to as a "range image", of the scene that can be processed to determine how long it takes light to travel from the camera to the features and back to the camera. The round trip flight times of the light to, and back from the features, and the speed of light are used to determine the distances to the imaged features.

In a gated TOF-3D camera, light pulses are transmitted to illuminate a scene and the camera is shuttered on, "gated on", following each light pulse for a relatively short exposure period to enable pixels in a photosensor of the camera to receive and register light from the light pulses reflected by features in the scene that reaches the camera. A pixel in the photosensor registers an amount of incident light it receives by generating, and accumulating, a quantity of electrons, hereinafter "photoelectrons", in the pixel that is substantially proportional to the amount of incident light. The accumulated photoelectrons are transmitted to a readout pixel comprised in the photosensor. A readout circuit converts a charge provided by the photoelectrons transferred to the readout pixel to a voltage, hereinafter also "photo-voltage", which provides a measure of the charge, and thereby the number of photoelectrons and the corresponding amount of incident light. A process of converting photoelectrons in a pixel to a photo-voltage is referred to as "reading" the pixel.

In order to provide reliable measurements of amount of light, photosensors are typically provided with a readout pixel that can accumulate a number of photoelectrons before it saturates that is equal to about twice a number of photoelectrons that saturates a pixel of the photosensor. A pixel saturates when a number of photoelectrons generated or received by the pixel is greater than the pixel's capacity to store photoelectrons. Photoelectrons in excess of a saturation threshold drain off to ground and cannot contribute to measurements of light.

Determination of a quantity of photoelectrons accumulated in a pixel by reading the pixel is subject to error from shot noise and read noise. Shot noise is a statistical error that is a function of the number of photoelectrons accumulated. If Ne is the number of photoelectrons, shot noise may be estimated to result in a fractional error (fractional error is % error multiplied by 100) in Ne equal to about $1/\sqrt{Ne}$. Read noise is independent of the number of photoelectrons. Read noise is a "device" noise that is introduced into a determination of a number of photoelectrons by the process of determining the number. If read noise is represented by a constant RE a fractional error in Ne may be estimated to be equal to about RE/Ne.

Distance to a feature in the scene imaged on a pixel of the camera photosurface is determined as a function of photo-voltage representing an amount of light that reaches the pixel from the feature during the short exposure periods, normalized to a photo-voltage representing a total amount of light reflected from the pulses that reaches the pixel from the feature. For convenience, light registered during the short exposure periods of the camera is referred to as "gated" light. An amount of light used to normalize gated light to determine distance is received during exposure periods that are substantially longer than the short exposure periods used to provide gated light, and is referred to as "ungated light".

Typically, widths of the light pulses and the short exposure periods are very small, and may for example be less than or about equal to 20 nsec (nanoseconds). As a result, amounts of gated light registered by pixels in a gated TOF-3D camera are often relatively small, and errors in measurements of gated light, and consequently in distance measurements provided by the TOF-3D camera due to shot and read noise can be relatively large. For features of a scene that have low reflectivity and/or are relatively far from the camera, amounts of light from the features registered by pixels on which the features are imaged can be so small that shot noise error in measurements of the light generates unacceptably large errors in distance measurements to the features. If camera parameters and/or lighting are adjusted to compensate for low reflectivity and/or for relatively large distances of features in the scene, near and/or high reflectivity features in the scene may be poorly imaged because light from these features saturates pixels in the camera.

As a result, for many applications of a TOF-3D camera, the camera does not have a dynamic range (DNR) for measuring incident light sufficiently large to acquire range images that provide acceptable distance measurements for both "dim" and "bright" features in a scene. A camera DNR is typically measured as a ratio between a maximum amount of light per unit area of the camera photosensor, which the camera measures with an acceptable precision, divided by a minimum amount of light per unit area of the photosensor, which the camera measures with an acceptable precision.

Light incident on a surface per second per unit area of the surface is referred to as irradiance. A maximum amount of light incident per unit area of a photosensor that a camera measures with an acceptable precision may therefore be referred to as a maximum integrated irradiance, (MaxIr). Similarly, a minimum amount of light incident per unit area of a photosensor that a camera measures with an acceptable precision may be referred to as a minimum integrated irradiance, (MinIr). A camera DNR may conveniently be defined by an expression DNR=MaxIr/MinIr.

SUMMARY

Aspects of an embodiment of the invention relate to providing a camera characterized by an improved DNR for acquiring an image of a scene responsive to light that the camera receives from the scene.

In an embodiment of the invention the camera comprises a photosensor having light sensitive pixels tiled into super pixels onto which the received light is imaged. Tiling a photosensor refers to subdividing the photosensor into areas that group pixels in the photosurface for convenient or advantageous reading. Tiling is generally implemented by programming Each super pixel into which the photosensor is tiled is partitioned into a plurality of non overlapping groups of pixels, which pixel groups together include all the pixels in the super pixel. Optionally, each pixel group in a same super pixel includes a different number of pixels. A controller transfers photoelectrons generated by light from the scene and accumulated in each pixel group to a readout pixel, and determines if a photo-voltage generated responsive to a quantity of the photoelectrons transferred from the pixel group to the readout pixel indicates that the quantity saturates the readout pixel.

The controller provides an estimate of an amount of light incident on the super pixel responsive to photo-voltage generated from quantities of photoelectrons from pixel groups in the super pixel that do not appear to saturate the readout pixel.

As a result of processing photoelectrons generated and accumulated in pixels of a super pixel in accordance with an embodiment of the invention, for a same given percent accuracy of measurement, a super pixel comprising N pixels of the photosensor has a MinIr that is equal to about 1/N times that of a single pixel in the photosensor. The super pixel also has a MaxIr substantially equal to a MaxIr of the single pixel. A camera, that configures its photosensor to have super pixels and determines intensities of light registered by the super pixels in accordance with an embodiment of the invention therefore has a DNR that is about N times that of a camera, hereinafter also a "conventional camera", which operates its photosensor without super pixels.

In an embodiment of the invention, the camera photo sensor is tiled to square, 4×4 super pixels, each comprising 16 pixels of the photosensor, and each partitioned into three pixel groups comprising respectively 1, 3, and 12 pixels. Each super pixel registers about 16 times an amount of light registered by a single pixel and when processed in accordance with an embodiment of the invention has a DNR that is about 16 times that of a conventional camera. Tiling a photosensor to 4×4 super pixels is referred to as operating the photosensor in a quarter-quarter video graphic array (QQVGA) mode. In some embodiments of the invention a camera comprises a photosensor tiled into square 2×2 super pixels and may be referred to as operating in a quarter video graphics array (QVGA) mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
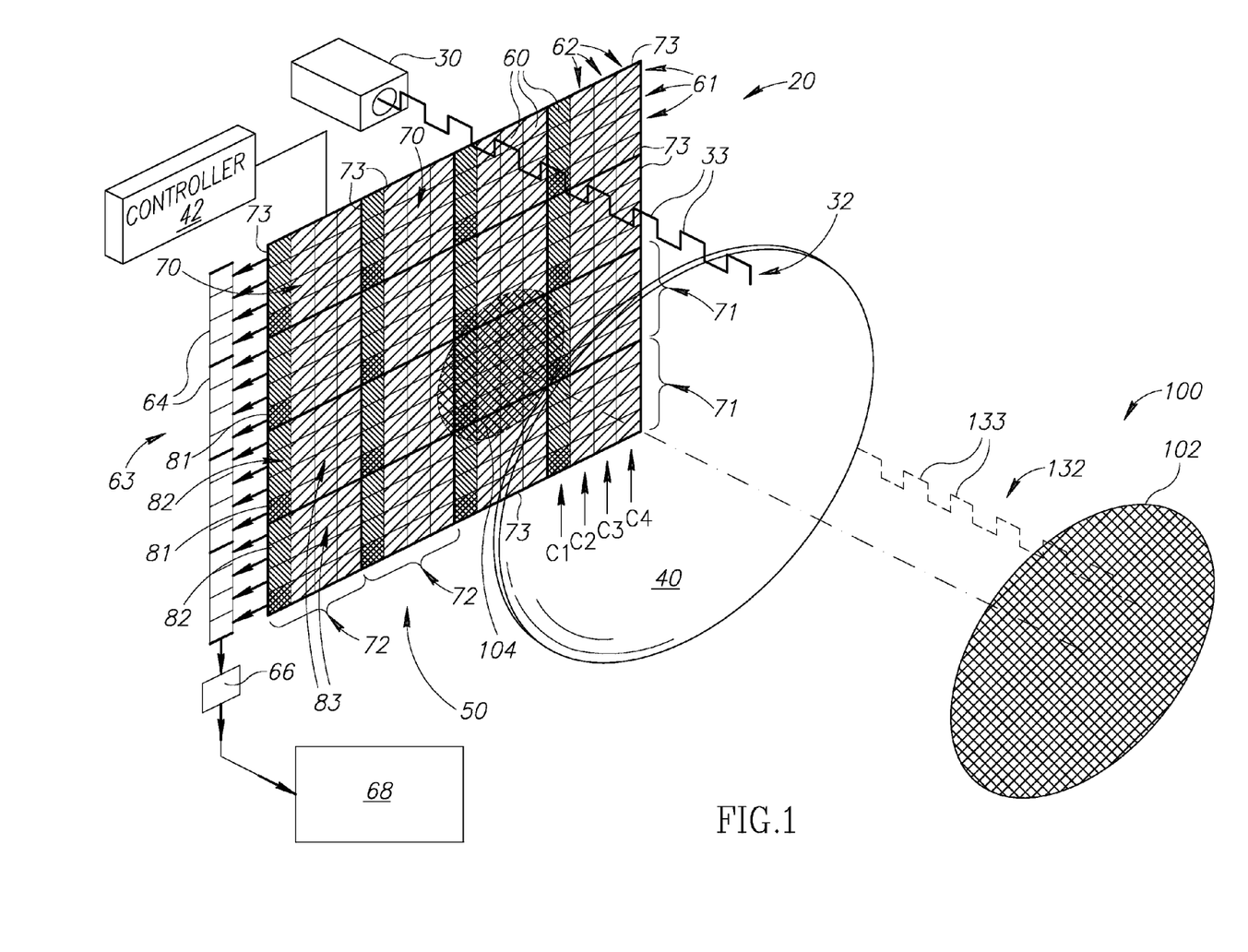
FIG. 1 schematically shows a TOF-3D camera comprising a photosensor comprising QQVGA super pixels acquiring an image of a scene having an object at a relatively large distance from the camera, in accordance with an embodiment of the invention.

In the following paragraphs of the detailed description, operation of a TOF-3D camera operating in a QQVGA mode for which the camera's photosensor is tiled into 4×4 super pixels, in accordance with an embodiment of the invention is discussed with reference to FIG. 1. In FIG. 1 the camera is schematically shown operating to acquire a range image of a scene comprising an object located relatively far from the camera, as a result of which an amount of light collected by the camera from the object and imaged on pixels of the camera's photosensor is relatively small. A procedure by which the TOF-3D camera reads super pixels in accordance with an embodiment of the invention is discussed with reference to FIGS. 2A-2C. An algorithm by which the TOF-3D camera determines quantities of photoelectrons accumulated by super pixels in the camera is discussed with reference to a flow diagram shown in FIG. 3. Aspects of imaging objects close to the TOF-3D camera are discussed with reference to FIG. 4 which shows the object in FIG. 1 moved so that it is relatively close to the camera. MinIr and MaxIr are discussed with reference to the figures and a DNR for a camera in accordance with an embodiment of the invention is provided.

FIG. 1 schematically shows a TOF-3D camera 20 imaging a scene 100 comprising an object 102 schematically represented by a shaded circle to acquire an image of the scene responsive to gated light and determine distances to regions of the object, in accordance with an embodiment of the invention. In FIG. 1 the object is assumed by way of example to be relatively far from the camera and to be characterized by moderate to low reflectivity.

TOF-3D camera 20 comprises a light source 30 controllable to radiate a train of relatively short light pulses schematically represented by a train 32 of pulses 33 to illuminate scene 100, a photosensor 50, and an optical system represented by a lens 40. Optical system 40 collects light that is reflected from light pulses 33 back to the camera by object 102 and images the collected light onto the photosensor. The optical system also comprises a shutter (not shown) for shuttering the camera open for relatively short exposure periods to acquire an image of scene 100 responsive to gated light, and optionally for relatively long exposure periods to acquire an image of the scene responsive to ungated light. A controller 42 controls the camera components.

Photosensor 50 comprises rows 61 and columns 62 of light sensitive pixels 60, a transfer column 63 of transfer pixels 64, a readout pixel 66 and readout circuitry 68 that converts charge provided by photoelectrons accumulated in the readout pixel to photo-voltage. In accordance with an embodiment of the invention photosensor 50 is tiled into rows 71 and columns 72 of super pixels 70. The super pixels are outlined by bold lines 73. By way of example, TOF camera 20 is assumed to be operating in a QQVGA mode and each super pixel is a square 4×4 super pixel comprising sixteen pixels 60. Each super pixel 70 is optionally divided into three pixel groups 81, 82 and 83 comprising respectively 1, 3 and 12 pixels 60. The different pixels groups are shaded differently to distinguish them. Optionally, pixel groups 81, 82 and 83 in different super pixels 70 are homologous.

Let columns 62 of pixels 60 in a same column 72 of super pixels 70 be referred to, left to right in FIG. 1, as columns C1, C2, C3 and C4. Optionally, pixels 60 in pixel groups 81 and 82 in a same column of super pixels 70 are located in column C1 as shown in FIG. 1. Optionally, pixels 60 in pixel groups 83 in a same column 72 of super pixels 70 are located in columns C2, C3, and C4 in the column of super pixels. For convenience of presentation in FIG. 1 and figures that follow, photosensor 50 is shown comprising only 4 rows and 4 columns of super pixels 70. Embodiments of the invention are of course not limited to four rows or four columns of pixels, and in practice a photosensor will in general comprise many hundreds of rows and columns of super pixels.

To acquire a range image of scene 100 and determine distances to regions of object 102 controller 42 controls camera 20 to image scene 100 responsive to gated light and an image of scene 100 responsive to ungated light. A distance to a region of object 102 imaged on a super pixel 70 is determined responsive to an amount of gated light registered by the super pixel normalized to an amount of ungated light registered by the pixel.

To image scene 100 responsive to gated light, controller 42 controls the shutter to shutter camera 20 open for a short exposure period following each pulse 33 during which exposure period pixels 60 in photosensor 50 register light reflected from the light pulses that reaches the camera and is imaged on the photosensor. Light reflected from light pulses 33 and imaged by optical system 40 on photosensor 50 is schematically represented by a train 132 of reflected light pulses 133 shown in dashed lines. An image of a region of object 102 imaged on a super pixel 70 responsive to reflected light pulses 133 registered by pixels 60 during the short exposure periods is schematically represented by a shaded circle 104 on the photosensor.

Following a last pulse 33 radiated by light source 30 to illuminate scene 100, the photosurface is "read" to determine a total amount of light, in the present example gated light, registered by each super pixel 70 during the short exposure periods following light pulses 33.

In accordance with an embodiment of the invention, photosensor 50 is read by reading super pixels in a first column 72 of super pixels, and then sequentially reading super pixels in the remaining columns 72. A first column 72 of super pixels 70 is on the left hand edge of photosensor 50.

Figures 2A, 2B, 2C:
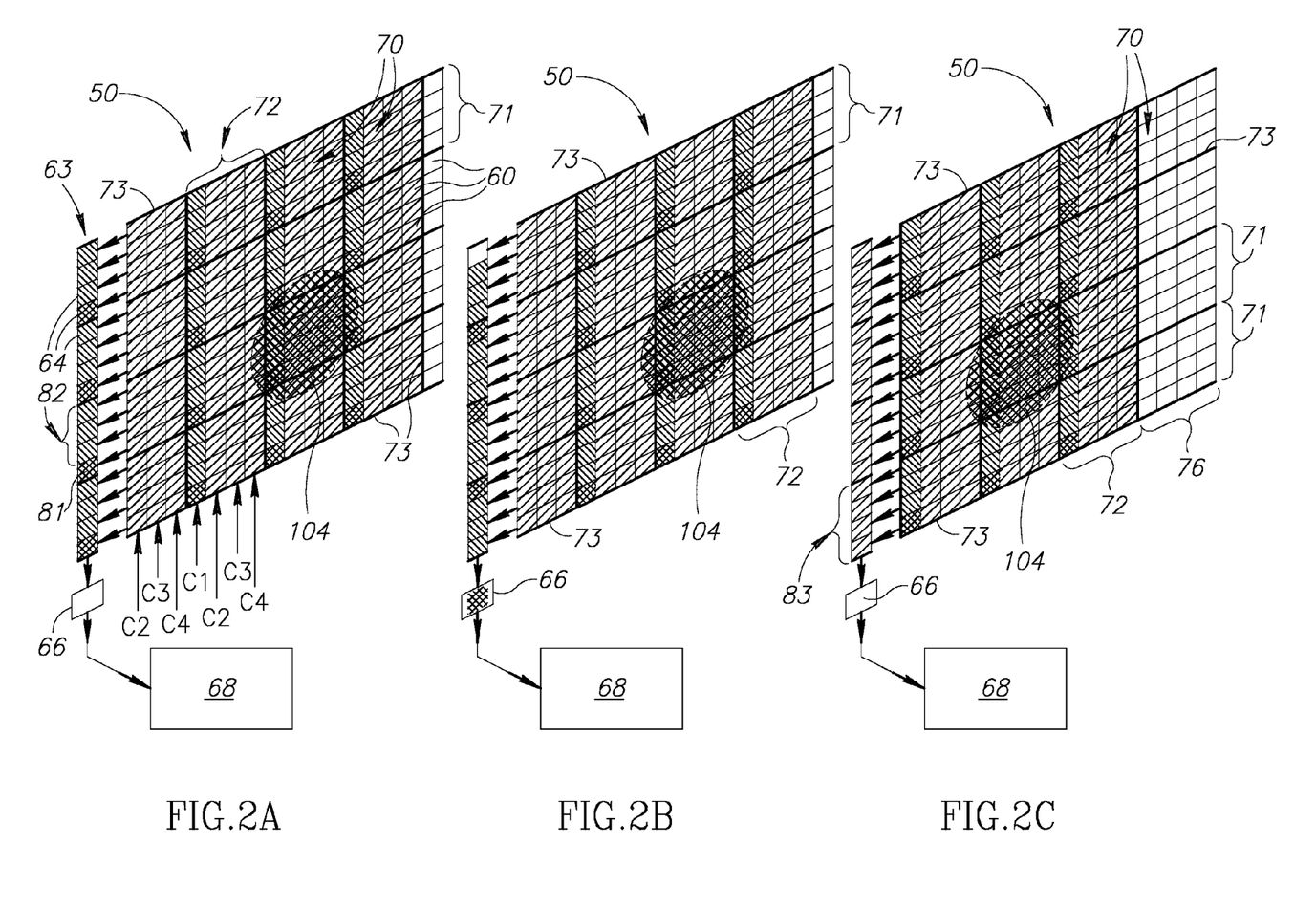
FIGS. 2A-2C schematically show a process for reading super pixels, in accordance with an embodiment of the invention.

To read super pixels 70 in a column 72 photoelectrons accumulated in pixels 60 of column C1 of the super pixel column are shifted into corresponding shift pixels 64 in shift column 63 by shifting the photoelectrons in all columns 62 of photosensor 50 one column 62 "left" toward the shift column (one column to the left in FIG. 1). FIG. 2A schematically shows photosensor 50 after photoelectrons from column C1 of the first column 72 of super pixels 70, are shifted into shift pixels 64 of shift column 63. Pixels in the figure that have no shading are pixels that have been emptied of photopixels in the process of shifting photoelectrons to shift column 63. Photoelectrons in shift pixels 64 are then shifted "down" to sequentially shift photoelectrons in pixel groups 81 and 82 in the shift column into readout pixel 66. FIG. 2B schematically shows photosensor 50 after photoelectrons in shift pixels 64 of shift column 63 have been shifted down by one shift pixel 64 to move electrons in a first (bottom in the figure) shift pixel 64 containing photoelectrons in a first group 81, into readout pixel 66.

After photoelectrons in a group 81 or 82 are shifted into readout pixel 66, readout circuit 68 converts the electric charge provided by the photoelectrons to a photo-voltage, thereby emptying the readout pixel and preparing it to receive photoelectrons from a next pixel group. Controller 42 stores the photo-voltage generated by readout circuit 68 for each pixel group for use later as discussed below.

Following reading of pixel groups 81 and 82 in column C1 of the super pixel column 70, controller 42 controls photosensor 50 to shift photoelectrons accumulated in pixel groups 83 into shift pixels 64 of shift column 63 by shifting photoelectrons in all columns 62 of pixels 60 three columns 62 left, towards the shift column. FIG. 2C schematically shows photosensor 50 after it has been controlled to shift the photoelectrons from pixel groups 83 in the first column 72 of super pixels 70 into shift column 63. After photoelectrons from pixel groups 83 from the first column of super pixels has been shifted into shift pixels 64, controller 42 controls the shift column to sequentially shift the photoelectrons from each pixel group down into readout pixel 66. Readout circuit 68 generates a photo-voltage for the photoelectrons from each pixel group 83, which controller 42 optionally stores.

Figure 3:
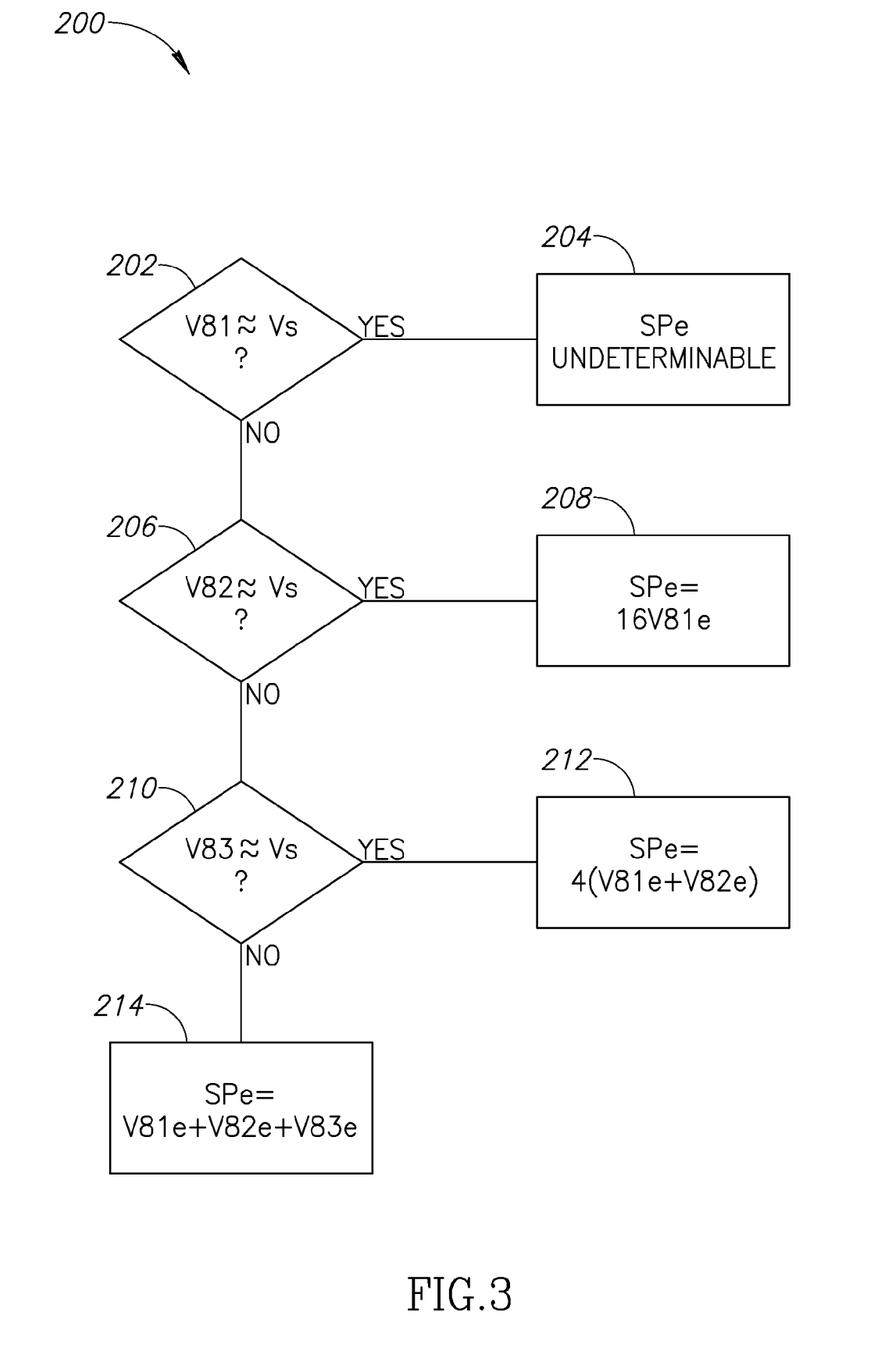
FIG. 3 shows a flow diagram of an algorithm that the TOF-3D camera shown in FIG. 1 executes to determine intensities of light registered by super pixels in accordance with an embodiment of the invention.

In accordance with an embodiment of the invention, controller 42 then uses the stored photo-voltages to determine a number of photoelectrons accumulated by each super pixel in column 70 in accordance with a flow diagram 200 of an algorithm shown in FIG. 3. Numeral 200 is also used to refer to the algorithm.

Let the photo-voltages determined for pixel groups 81, 82 and 83 for a given super pixel be represented by V81, V82, and V83 respectively. Let a number of photoelectrons accumulated by pixel groups 81, 82, and 83, corresponding to photo-voltages V81, V82, and V83 be represented by V81$e$, V82$e$, and V83$e$. Let a number of photoelectrons in a super pixel comprising the pixel groups be represented by SPe. It is noted that for a same light intensity incident on all pixel groups of the given super pixel, it is expected that V83=12V81 and that V82=3V81.

In a decision block 202 of algorithm 200, controller 42 checks to decide if V81 indicates that a number V81$e$ of photoelectrons in response to which V81 was generated, indicates that the number V81$e$ saturated readout pixel 66. In an embodiment of the invention, a photo-voltage generated by readout circuit 68 responsive to charge provided by photoelectrons in readout pixel 66 is assumed to saturate the readout pixel if it is about equal to a photo-voltage, $V_S$, which is generated when the readout pixel is filled to capacity with photoelectrons. If V81 is equal to about $V_S$, in symbols V81≈$V_S$, the controller proceeds to a block 204. In block 204 the controller determines that that the super pixel is saturated and that a quantity, SPe, of photoelectrons accumulated by the super pixel cannot reliably be determined.

If on the other hand V81 does not saturate readout pixel 66, controller 42 proceeds to a decision block 206 to decide whether photo-voltage V82≈$V_S$ and therefore that photoelectrons transferred to readout pixel 66 saturated the readout pixel. If V82≈$V_S$ controller 42 proceeds to a block 208 and determines that a number of photoelectrons, SPe, accumulated by the super pixel during the short gates is about 16 times V81$e$, that is, SPe=16(V81$e$). If on the other hand, V82<$V_S$, controller 42 proceeds to a decision block 210 to determine if V83≈$V_S$. If V83≈$V_S$ controller 42 proceeds to a block 212 and determines that SPe=4(V81$e$+V82$e$). If on the other hand V83<$V_S$, then the controller proceeds to a block 214 and determines that SPe=(V81$e$+V82$e$+V83$e$).

Under the stated assumptions that object 102 is relatively far from camera 20 and not characterized by a particularly high reflectivity, it is expected that each pixel 60 on which image 104 (FIGS. 2A-2C) of object 102 is formed accumulates a relatively small number of photoelectrons. As a result, determinations of quantities of photoelectrons in the pixels will be subject to relatively large shot noise and read noise, and distances to regions of object 102 using the determinations will be characterized by relatively large error margins. On the other hand, because of the relatively small quantities of photoelectrons stored in pixels 60, it is expected that none of the pixel groups 81, 82 and 83 in the various super pixels 70 on which image 104 is formed saturates readout pixel 66, and that therefore SPe for the super pixels will be equal to (V81$e$+V82$e$+V83$e$).

The sum (V81$e$+V82$e$+V83$e$) is relatively large compared to a number of photoelectrons accumulated in a single pixel 60. As a result, a distance measurement based on a number of photoelectrons accumulated by a super pixel 70 in accordance with an embodiment of the invention is substantially more accurate than a distance measurement based on single pixel 60.

For example, for the QQVGA operation of camera 20, it is reasonable to assume that a number of photoelectrons, SPe, determined for a super pixel 70 will, on the average, be about 16 times larger than a number of photoelectrons accumulated in a single pixel 60. A fractional error in SPe due to shot noise will therefore be about ¼ that of a determination of a number of photoelectrons in a single pixel 60. A fractional error in SPe due to read noise will be about ⅛ that of a fractional read noise error in a number of photoelectrons in a single pixel 60. As a result, a distance measurement determined from SPe for a super pixel in accordance with an embodiment of the invention, will be characterized by a substantially smaller error than a distance determined from a number of photoelectrons accumulated in a pixel 60.

Furthermore, if a minimum number photoelectrons is required to provide a quantity of photoelectrons having an acceptable magnitude of shot noise and read noise, TOF-3D camera 20 can provide the minimum number at an irradiance of its photosensor 50 that is about 16 time smaller than an irradiance required to provide the minimum number from a single pixel 60. As a result, TOF-3D camera 20 in accordance with an embodiment of the invention is characterized by a MinIr that is about 16 times less than a MinIr of a single pixel 60. In general, a camera operating a photosensor having super pixels comprising N pixels, in accordance with an embodiment of the invention, is characterized by an improved MinIr that is 1/N that of the MinIr of a conventional camera.

Whereas for the case of discussed above for which object 102 is located relatively far from camera 20, pixels 60 in general accumulate relatively small numbers of photoelectrons responsive to light pulses 133, the pixels imaging object 102 may accumulate substantially greater numbers of photoelectrons if the object is located relatively close to the camera. Irradiance of photosensor 50 from light pulses 133 increases inversely as the square of the distance of object 102 from camera 20.

Figure 4:
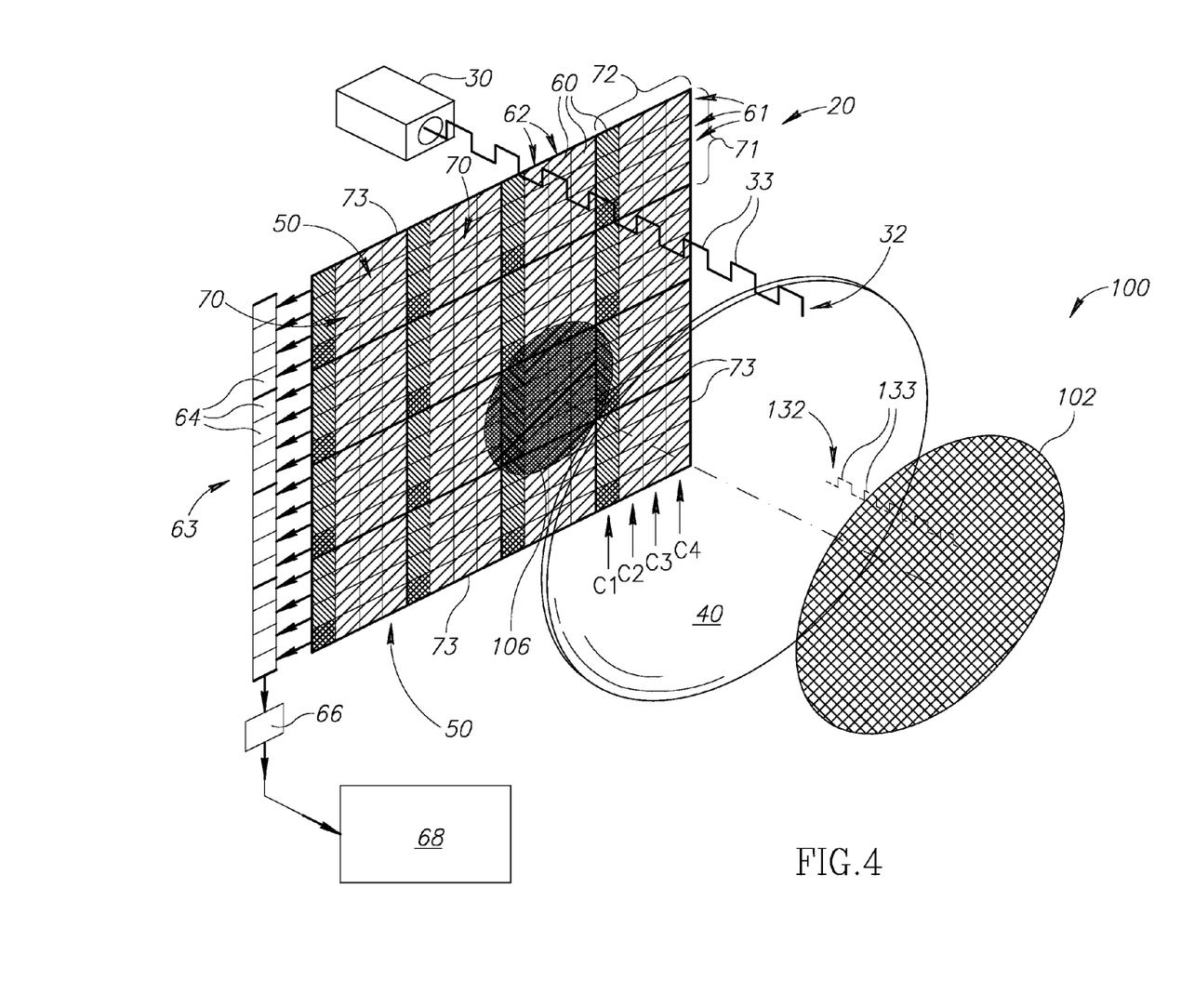
FIG. 4 schematically shows the TOF-3D camera shown in FIG. 1 acquiring an image of a scene having an object at a relatively small distance from the camera, in accordance with an embodiment of the invention.

For example, if object 102 is located about 3 m (meters) from TOF-3D camera 20 in FIG. 1, and it moves to a distance equal to about 0.5 m from the camera, pixels 60 that image the object at the closer distance will receive about 36 time more light than pixels 60 that imaged the object in FIG. 1. FIG. 4 schematically shows object 102 being imaged by camera 20 at the closer distance. An image 106 of the object formed on photosensor 50 in FIG. 4 is shown shaded substantially darker than image 104 of the object shown in FIG. 1 to indicate the increased irradiance of pixels 60 in image 106 relative to irradiance of pixels 60 in image 104.

For the situation shown in FIG. 4 it is expected that for many super pixels 70 on which object 102 is imaged, quantities of photoelectrons in pixel groups 81, 82, and 83 will saturate readout pixel 66, and not all of the pixel groups will be used to determine a number of photoelectrons for the super pixels. An estimate for a number SPe of photoelectrons in the super pixels will instead be expected to be made in accordance with the expressions SPe=16(V81$e$) and SPe=4(V81$e$+V82$e$) shown in blocks 204 and 208 respectively in the flow diagram for algorithm 200, rather than the expression SPe=(V81$e$+V82$e$+V83$e$) shown in block 214 of the flow diagram.

By determining a quantity of photoelectrons for a super pixel, such as a super pixel 70, in accordance with an embodiment of the invention, responsive to quantities of photoelectrons in pixels groups that do not saturate readout pixel 66, super pixels in photosensor 50 are characterized by a MaxIr that is substantially equal to a MaxIr of a single pixel 60. TOF-3D camera 20 therefore has a DNR=MaxIr/MinIr that is about 16 times that of a conventional camera. In general, a camera operating a photosensor having super pixels comprising N pixels in accordance with an embodiment of the invention, has a DNR that is about N times that of a conventional camera.

It is noted that were a photo-voltage generated for a super pixel having N pixels responsive to photoelectrons in a readout pixel only after all the photoelectrons in the pixels of a super pixel were transferred to the readout pixel, the super pixel would have a MaxIr less than that provided by a single pixel. For example, if a quantity of $S_e$ photoelectrons saturates a pixel of the photosensor, and a quantity of $SR_e$ photoelectrons saturates the readout pixel, a MaxIr for the super pixel would be less than about $(SR_e/SP_e)/N$ times a MaxIr for a single pixel. A camera operating such super pixels would have a DNR limited to no more than $(SR_e/SP_e)$ times that of a conventional camera. If, as is common, $S_e$ were equal to about twice a number of photoelectrons that saturates a pixel in the photosurface, then a MaxIr available from the super pixel would be equal to about 2/N that of a single pixel and a camera operating the super pixels would have a DNR not more than twice that of a conventional camera.

Whereas in the above description embodiments of the invention refer to a TOF-3D camera, practice of the invention is not limited to TOF-3D cameras but may be used in any type of camera comprising pixels to increase a DNR of the camera. For example, super pixels and methods of determining amounts of light registered by the super pixels in accordance with an embodiment of the invention, may be used to provide an increased DNR for cameras that provide contrast images, that is pictures, of a scene.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A camera comprising:
   a photosensor comprising a plurality of pixels configured to accumulate photoelectrons responsive to incident light, which photosensor is tiled to a plurality of super pixels, each partitioned into a plurality of pixel groups;
   a readout pixel configured to receive photoelectrons from the pixel groups;
   circuitry that operates to provide a measure of how many photoelectrons are contained in the readout pixel; and
   a controller configured to:
      transfer photoelectrons accumulated in each pixel group in a super pixel of the plurality of super pixels into the readout pixel to acquire a measure provided by the circuitry of the accumulation of photoelectrons in the pixel group;

determine responsive to the measures which pixel groups have an accumulation of photoelectrons that does not saturate the readout pixel and which pixel groups have an accumulation of photoelectrons that saturates the readout pixel; and determine a measure of the number of photoelectrons in the super pixel responsive to a function of the measurements of accumulations of photoelectrons in pixel groups of the plurality of pixel groups that do not saturate the readout pixel, which function has a form determined responsive to measurements of the number of photoelectrons in at least two of the pixel groups and is independent of accumulations of photoelectrons in pixel groups that do saturate the readout pixel.

2. The camera according to claim 1 wherein the pixel groups in a super pixel are non-overlapping.

3. The camera according to claim 1 wherein no two pixel groups in a super pixel comprise a same number of pixels.

4. The camera according to claim 3 wherein the controller determines accumulations of photoelectrons for the pixel groups sequentially in increasing order of the number of pixels the pixel groups comprise.

5. The camera according to claim 1 wherein the pixels are arrayed in rows and columns.

6. The camera according to claim 5 wherein the super pixels are arrayed in rows and columns.

7. The camera according to claim 6 wherein the super pixels are QQVGA pixels each comprising sixteen pixels.

8. The camera according to claim 7 wherein the pixel groups comprise respectively one, three and twelve pixels.

9. The camera according to claim 8 wherein the pixels comprised in pixel groups comprising one and three pixels are located in a same column or row of pixels.

10. The camera according to claim 1 controllable to determine distances to features of a scene that the camera images.

11. The camera according to claim 10 wherein the camera is a time of flight 3D camera.

12. The camera according to claim 1 wherein to determine which pixel groups have an accumulation of photoelectrons that saturates the readout pixel, the controller:

determines a smallest pixel group comprised in the super pixel having an accumulation of photoelectrons that saturates the readout pixel; and determines that accumulations of photoelectrons in pixel groups in the super pixel larger than the smallest pixel group having an accumulation of photoelectrons that saturates the readout pixel, saturates the readout pixel.

13. The camera according to claim 12 wherein the measure of the total number of photoelectrons in the super pixel is equal to a measure of the total accumulation of photoelectrons in pixel groups smaller than the smallest pixel group having an accumulation of photoelectrons that saturates the readout pixel, multiplied by a number equal to a number of pixels in the super pixel divided by a total number of pixels in the pixel groups smaller than the smallest pixel group having an accumulation of photoelectrons that saturates the readout pixel.

14. The camera according to claim 13 wherein the controller determines that a measure of the number of photoelectrons in the superpixel cannot be provided if the accumulation of photoelectrons in each of the pixel groups in the super pixel is indicated as saturating the readout pixel.

15. A method of measuring intensity of light incident on a photosensor comprising a plurality of light sensitive pixels that accumulate photoelectrons responsive to incident light, the method comprising:

tiling the photosensor into a plurality of super pixels, each partitioned into a plurality of pixel groups;

determining measures of amounts of photoelectrons accumulated by pixel groups to determine which pixel groups in a super pixel acquire an accumulation of photoelectrons responsive to the incident light that saturates a readout pixel and which pixel groups do not acquire an accumulation of photoelectrons that saturate the readout pixel; and determining a measure of an accumulation of photoelectrons for the super pixel responsive to a function of the measurements of accumulations of photoelectrons determined not to saturate the readout pixel that has a form determined responsive to measurements of the number of photoelectrons in at least two of the pixel groups and is independent of the accumulations of photoelectrons determined to saturate the readout pixel.

* * * * *